United States Patent [19]

Vogt et al.

[11] 3,923,690

[45] Dec. 2, 1975

[54] CARRIER-SUPPORTED CATALYST

[75] Inventors: Wilhelm Vogt, Hurth-Efferen; Hermann Glaser; Helmut Dyrschka, both of Erftstadt Lechenich, all of Germany

[73] Assignee: Hoechst Aktiengesellschaft, Cologne, Germany

[22] Filed: May 6, 1974

[21] Appl. No.: 467,054

[30] Foreign Application Priority Data
May 9, 1973 Germany.............................. 2323262
Mar. 14, 1974 Germany.............................. 2412162

[52] U.S. Cl............... 252/447; 252/462; 252/466 J; 423/213.5
[51] Int. Cl.². B01J 21/18; B01J 23/10; B01J 21/04
[58] Field of Search................ 252/466 J, 447, 462; 423/213.2, 213.5

[56] References Cited
UNITED STATES PATENTS
3,322,491  5/1967  Barrett et al...................... 423/213.5

Primary Examiner—W. J. Shine
Attorney, Agent, or Firm—Connolly and Hutz

[57] ABSTRACT

Carrier-supported catalyst comprised of a mixture of aluminates of copper, manganese and nickel as is active ingredients, and of pure aluminum oxide as its carrier. The catalyst contains the aluminates in a total proportion of 10 to 45 weight % and may contain copper, manganese and nickel in a ratio by weight of (2–4) : (1–2) : (0.1–1). Between 0.5 and 10 weight % of cerium in oxide form may be further applied to the catalyst.

22 Claims, No Drawings

CARRIER-SUPPORTED CATALYST

The present invention relates to a carrier-supported catalyst and to a process for making it.

It is known that carbon monoxide and hydrocarbons can be oxidized in contact with catalysts, wherein the active ingredients are selected from noble metals belonging to group VIII of the Periodic System of the elements, or from mixed oxides, e.g. of copper, manganese and nickel, the mixed oxides being preferred for reasons of economy so as to enable wide use to be made of the catalysts, for example in the decontamination of motor exhaust gas.

German Patent Specification Offenlegungsschrift 1,476,608, for example, describes a filtering apparatus for the decontamination of exhaust gas coming from internal combustion engines, the apparatus having one or more layers of rigid degradative-resistant carrier material placed or inserted therein. The carrier material which comprises, for example, alumina or magnesium oxide, is calcined at high temperature and impregnated with decomposable salts of manganese, copper or nickel, the salts so applied on to the carrier being successively oxidized at high temperatures and transformed into the corresponding oxides.

In U.S. Pat. No. 3,493,325 which describes the catalytic oxidation of exhaust gas coming from hydrocarbon combustion engines, use is made of a carrier-supported catalyst, wherein the carrier may comprise various aluminum oxides including activated and gel-like aluminum oxides. The catalyst is made by impregnating the carrier with one or more nitrates of copper, manganese and nickel, drying the carrier so impregnated at 120°C and calcining it at 500°C.

One disadvantage of the known catalysts resides in the fact that their activity varies depending on whether they are contacted with an oxidizing or reducing gas. More particularly, the catalyts are very active if contacted with a mixture comprising the gas to undergo oxidation and a stoichiometric proportion or slightly understoichiometric proportion of oxygen. They are less active, however, in all those cases in which they are contacted with a gas mixture containing an excess of oxygen.

It is accordingly necessary for the known catalysts to be contacted with a mixture comprising the gas to undergo oxidation and a proportion of oxygen stoichiometric with respect to the carbon monoxide and hydrocarbons contained therein. This is more particularly necessary (a) for the catalysts, so as to remain active and (b) for the combustion of the gas to undergo combustion, so as to be complete. This requirment is difficult to meet, if at all with heavy expenditure of equipment in view of the continually varying concentration of carbon monoxide and hydrocarbons in the exhaust gas from internal combustion engines.

It is accordingly an object of the present invention to provide a carrier-supported catalyst for the combustion of carbon monoxide and hydrocarbons with the use of one or more oxygen-containing gases to carbon dioxide and water, the catalyst being characterized in that it has a high mechanical strength and commences activity at low temperatures, which remains substantially unaffected by the concentration of oxygen in the gas mixture contacted therewith.

The present invention provides more particularly a carrier-supported catalyst comprising a mixture of aluminates of copper, manganese and nickel as its active ingredients and pure aluminum oxide as its carrier, the total proportion of aluminates being within the range 10 and 45 wt. %.

Further embodiments of the present invention, which can be used singly or in combination, provide for the carrier-supported catalyst:

a. to contain the aluminates in a total proportion within the range 20 and 35 wt. %;
b. to contain copper, manganese and nickel in a ratio by weight within the range (2–4) : (1–2) : (0.1–1);
c. to have between 0.5 and 10 weight % of cerium in oxide form deposited thereon;
d. to have between 1 and 7 wt. % of cerium in oxide form deposited thereon;
e. to have a compressive strength within the range 3 and 14 kg/mm and
f. to have a compressive strength within the range 4 and 10 kg/mm.

The process for making the carrier-supported catalyst of the present invention comprises transforming pure aluminum oxide into moulded material; calcining the moulded material at temperatures within the range 1000° and 1200°C; impregnating the calcined moulded material with an aqueous solution of one or more salts of copper, nickel and mananese with a decomposable acid; decomposing the metal salts applied to the moulded material at temperatures within the range 300° and 600°C; and calcining the resulting metal-oxide containing moulded material at temperatures within the range 800° and 1200°C.

Further features of the process of the present invention, which can be used singly or in combination, comprise:

g. impregnating the calcined moulded material with an aqueous solution of a cerium salt of a readily decomposable acid; drying the cerium salt applied to the moulded material at temperatures within the range 130° and 150°C; decomposing the dry cerium salt on the moulded material by gradual heating at temperatures within the range 200° and 300°C and within the range 450° and 550°C, respectively; and calcining the resulting cerium oxide-containing moulded material at temperatures within the range 700° and 900°C;
h. producing the pure aluminum oxide by hydrolyzing aluminum chloride with the use of an oxyhydrogen flame;
i. stirring the aluminum oxide into water and drying the resulting paste at 100°C;
j. grinding the paste so dried;
k. moulding the aluminum oxide in admixture with graphite;
l. moulding the aluminum oxide in admixture with between 3 and 10 wt. %, preferably 5 wt. %, of graphite;
m. burning off the graphite prior to subjecting the mouldded material to calcination;
n. burning off the graphite at temperatures within the range 500° and 750°C, preferably at 650°C;
o. using nitrates as the copper, manganese, nickel and cerium salts of decomposable acids;
p. decomposing the copper, manganese and nickel nitrates at temperatures within the range 350° and 450°C; and
q. calcining the moulded material containing copper, manganese and nickel oxides at temperatures within the range 950° and 1050°C.

The carrier-supported catalyst of the present invention is particularly well adapted for use in the oxidation of carbon monoxide and hydrocarbons with an excess of oxygen, which undergo complete combustion as the activity of the carrier-supported catalyst remains substantially unaffected by the concentration of oxygen in the gas mixture which is contacted therewith.

Despite the fact that the aluminates of copper, manganese and nickel are soft pulverulent substances, the carrier-supported catalyst of the present invention is degradative-resistant material of high compressive strength, which is obviously obtained by the incorporation of the metal aluminates into the aluminum oxide frame.

In each of the following Examples, 17 normal liters (N.T.P) per cc of catalyst per hour of a test gas mixture containing 3% by volume of $O_2$, 2% by volume of CO, 1000 ppm (parts per million) of n-hexane, 2.5% by volume of steam, the balance being $N_2$, was oxidized in contact with a carrier-supported catalyst. THe test gas mixture was heated to the testing temperature used in each particular case, prior to being contacted with the carrier-supported catalyst. The residual content of CO and n-hexane was identified in the oxidized gas and the conversion rate of these two components, expressed in percent, was calculated therefrom.

The temperature at which 50 and 90 %, respectively, of CO and n-hexane were found to have been converted to $CO_2$ and $H_2O$ ($U_{50\ CO}$; $U_{90\ CO}$; $U_{50\ hex.}$; $U_{90\ hex.}$) was used as an index of the catalysts' activity.

The compressive strength of the catalysts was determined between two plane parallel plates, in longitudinal direction of the moulded material.

EXAMPLE 1: (Prior art)

Commercial aluminium oxide having a particle size of 3 mm and a BET-surface area approaching 80 m²/g was impregnated with an aqueous metal nitrate solution so as to deposit 5.1% of Cu, 2.94% of Mn and 1.57% of Ni thereon. By heating to 400°C, the metal nitrates were converted to oxides and the catalyst was calcined for 18 hours at 1000°C. Its activity was determined and the following results were obtained:
$U_{50\ CO}$ : 335°C  $(10)^2 U_{50\ hex.}$ : 485°C The catalyst was contacted over a period of 2 hours at 400°C with a gas mixture of 2% by volume of CO and 98% by volume of $N_2$. Its activity was determined and the following results were obtained:
$U_{50\ CO}$ : 200°C  $(10)^2 U_{50\ hex.}$ : 430°C The catalyst was heated in contact with the test gas mixture of 600°C, successively cooled and its activity was determined. THe following results were obtained:
$U_{50\ CO}$ : 330°C  $(10)^2 U_{50\ hex.}$ : 480°C As can be seen, the catalyst activity was reduced in contact with oxidizing gas.

EXAMPLE 2: (Prior art)

Commercial sintered aluminum oxide having a particle size of 3 mm and a BET-surface area approaching 0.25 m²/g was impregnated in the manner described in Example 1 with an aqueous metal nitrate solution. The metal nitrates applied to the carrier were decomposed at 400°C and the catalyst was calcined for 18 hours at 1000°C. Its activity was determined and the following results were obtained:
$U_{50\ CO}$ : 395°C  $(10)^2 U_{50\ hex.}$ : 585°C The catalyst so made was reduced at 400°C with the use of a gas mixture of 2% by volume of CO and 98% by volume of $N_2$ and its activity was determined. The following result was obtained:
$U_{50\ CO}$ : 270°C  $(10)^2 U_{50\ hex.}$ : 450°C The catalyst was heated in contact with the test gas mixture to 600°C, successively cooled and its activity was determined. The following results were obtained:
$U_{50\ CO}$ : 395°C  $(10)^2 U_{50\ hex.}$ : 585°C As can be seen, the catalyst activity was reduced in contact with oxidizing gas.

EXAMPLE 3: (Invention)

Pure aluminum oxide free substantially completely from alkali and silicate was produced by hydrolyzing anhydrous aluminum chloride with the use of an oxyhydrogen flame. To produce a flowable mass, the aluminum oxide so made was stirred into water and the resulting paste was dried at 100°C. The dry mass was gound, mixed with 5 weight % of graphite an the mixture was moulded into cylindrical shapes 3 long and 3 mm wide. The graphite, which was used as a moulding aid, was burned off at 650°C and the shapes were calcined for 20 hours at 1000°C. The cylindrical shapes then has a BET-surface area of 6.9 m²/g, a volume of pores of 0.32 cubic centimeter/g and a compressive strength of 8.1 kg/mm, identified between plane parallel plates in longitudinal direction.

The cylindrical shapes so made were impregnated in the manner described in Example 1 with a metal nitrate solution, and the nitrates were decomposed by heating to 400°C. The catalyst was successively calcined for 18 hours at 1000°C. It then had a compressive strength of 5.0 kg/mm. Its activity was determined and the following results were obtained:
$U_{50\ CO}$ : 200°C
$U_{90\ CO}$ : 285°C
$U_{50\ hex.}$ : 360°C The catalyst was treated in a reducing atmosphere (cf. Examples 1 and 2). Its activity could not be found to have been changed.

EXAMPLE 4: (Invention)

$Al_2O_3$ shapes were produced in the manner described in Example 3, but calcined for 20 hours at 1100°C. The cylindrical shapes then had a BET-surface area of 6.3 m²/g, a volume of pores of 0.32 cubic centimeter /g and a compressive strength of 8.1 kg/mm. The catalyst so treated was impregnated with the metal nitrate solution and calcined in the manner described in Example 3 and then had a compressive strength of 6.5 kg/mm. Its activity was determined and the following results were obtained:
$U_{50\ CO}$: 175°C  $(10)^3 U_{50\ hex.}$ : 340°C The catalyst was treated in a reducing atmosphere (cf. Examples 1 and 2). Its activity could not be found to have been changed.

Propylene was substituted for n-hexane in the test gas mixture and the following result was obtained:
$U_{50\ prop.}$ : 285°C

EXAMPLE 5: (Invention)

$Al_2O_3$ shapes were produced in the manner described in Example 3, but calcined for 20 hours at 1200°C. The cylindrical shapes then had a BET-surface area of 4.0 m²/g, a volume of pores of 0.24 cm³/g and a compressive strength of 13.7 kg/mm. The catalyst so treated was impregnated with the metal nitrate solution, calcined in the manner described in Example 3 and then had a compressive strength of 10.3 kg/mm. Its activity was determined and the following results were obtained:

$U_{50\ CO}$: 205°C   $U_{50\ hex.}$: 390°C

The catalyst was contacted for 2 hours at 400°C with a gas mixture of 2% by volume of CO and 98% by volume of $N_2$. Its activity was substantially unchanged.

$U_{50\ CO}$: 195°C   $(10)^2 U_{50\ hex.}$: 380°C

EXAMPLE 6: (Comparative Example)

A concentrated solution of copper nitrate was added to a suspension of pure aluminum oxide completely free from alkali and silicate in water. The copper solution was more particularly added in such a quantity that he resulting mass contained 5.1% of Cu, based on its $Al_2O_3$-content. After drying at 100° – 200°C, the mass was ground, mixed with 5 weight % of graphite as a moulding aid, and made into cylindrically shaped moulded articles 3 mm long and 3 mm wide. The moulded articles were heated for 12 hours to 650°C and successively impregnated with a metal nitrate solution so as to deposit 2.94% of Mn and 1.57% of Ni thereon, and the nitrates were decomposed by heating to 400°C. After having been calcined for 18 hours at 1000°C, the catalyst had a BET-surface area of 12.2 m²/g, a volume of pores of 0.29 cm³/g and a compressive strength of 3.6 kg/mm. Its activity was determined and the following results were obtained:

$U_{50\ CO}$: 260°C   $(10)^2 U_{50\ hex.}$: 400°C

The catalyst was contacted for 2 hours with a gas mixture of 2% by volume of CO and 98% by volume of $N_2$, at 400°C. Its activity was found to have been changed as follows:

$U_{50\ CO}$: 230°C   $(10)^2 U_{50\ hex.}$: 360°C

EXAMPLE 7: (Invention)

A catalyst was produced in the manner described in Example 3 save that it was impregnated with the metal nitrate solution so as to deposit 4% of Cu, 2% of Mn and 0.2% of Ni thereon. The catalyst so made had a volume of pores of 0.29 cm³/g and a compressive strength of 6.8 kg/mm. Its activity was determined and the following results were obtained:

$U_{50\ CO}$: 195°C   $(10)^2 U_{50\ hex.}$: 365°C

The catalyst so made was subjected to the reducing treatment described in Example 6. Its activity could not be found to have been changed.

EXAMPLE 8: (Invention)

A catalyst was produced in the manner described in Example 3 save that it was impregnated with the metal nitrate solution so as to deposit 8% of Cu, 4% of Mn and 0.4% of Ni thereon. The catalyst had a volume of pores of 0.29 cm³/g and a compressive strength of 2.8 kg/mm. Its activity was determined and the following results were obtained:

$U_{50\ CO}$: 225°C   $(10)^2 U_{50\ hex.}$: 380°C

The catalyst so made was subjected to the reducing treatment described in Example 6. Its activity remained substantially unchanged.

EXAMPLE 9: (Comparative Example)

A catalyst was prepared in the manner described in Example 3 save that it was impregnated with the metal nitrate solution so as to deposit 12% of Cu, 6% of Mn and 0.6% of Ni thereon. The catalyst had a volume of pores of 0.28 cm³/g and a compressive strength of 1.27 kg/mm. Its activity was determined and the following results were obtained:

$U_{50\ CO}$: 235°C   $(10)^2 U_{50\ hex.}$: 400°C

The catalyst was subjected to the reducing treatment described in Example 6. Its activity was determined and the following results were obtainned:

$U_{50\ CO}$: 215°C   $(10)^2 U_{50\ hex.}$: 365°C

EXAMPLE 10: (Comparative Example)

$Ce(NO_3)_3 \cdot 6 H_2O$ was dried until the nitrate commenced decomposition and shaped into moulded material. The shapes were heated in contact with air for 10 hours to 500°C and for a further 10 hours to 800°C. The activity was determined and the following results were obtained:

$U_{50\ CO}$: 430°C   $(10)^2 U_{50\ hex.}$: 560°C
$U_{90\ CO}$: 540°C   $(10)^2 U_{90\ hex.}$: 660°C

EXAMPLE 11: (Invention)

Catalysts produced in the manner described in Example 3 were impregnated with an aqueous cerium nitrate solution so as to deposit 2%, 4% and 6% of Ce, respectively, thereon. The cerium salt so applied to the catalyst was dried for 32 hours at 140°C and then decomposed by first heating it for 3 hours to 250°C and thereafter heating it for 10 hours to 500°C. Following this, the catalyst was calcined for 10 hours at 800°C. The activity and compressive strength of the catalysts so made were determined. The results obtained are indicated in the following Table:

Table:

| % Ce | $U_{50\ CO}$ | $U_{90\ CO}$ | $U_{50\ hex.}$ | Compressive strength kg/mm |
|---|---|---|---|---|
| 2 | 150 | 195 | 370 | 4.7 |
| 4 | 140 | 180 | 380 | 4.8 |
| 6 | 110 | 160 | 390 | 4.1 |

We claim:

1. A carrier-supported catalyst comprising a mixture of aluminates of copper, manganese and nickel as its active ingredients and aluminum oxide as its carrier, the total proportion of aluminates being within the range 10 to 45 wt. %.

2. The carrier-supported catalyst as claimed in claim 1, wherein the total proportion of the aluminates is within the range 20 to 35 wt. %.

3. The carrier-supported catalyst as claimed in claim 1, containing copper, manganese and nickel in a ratio by weight within the range (2–4) : (1–2) : (0.1–1).

4. The carrier-supported catalyst as claimed in claim 1, having between 0.5 and 10 weight % of cerium in oxide form deposited thereon.

5. The carrier-supported catalyst as claimed in claim 4, having between 1 and 7 weight % of cerium in oxide form deposited thereon.

6. The carrier-supported catalyst as claimed in claim 1, having a compressive strength within the range 3 to 14 kg/mm.

7. The carrier-supported catalyst as claimed in claim 6, having a compressive strength within the range 4 to 10 kg/mm.

8. A process for making the carrier-supported catalyst as claimed in claim 1, comprising transforming aluminum oxide substantially completely free from alkali and silicate into moulded material; calcining the moulded material at temperatures within the range 1000° to 1200°C; impregnating the calcined moulded material with an aqueous solution of copper, nickel and manganese salts of decomposable acids; decomposing the metal salts applied to the moulded material at temperatures within the range 300° to 600°C; and calcining the resulting metal oxide-containing moulded material at temperatures within the range 800° to 1200°C.

9. The process as claimed in claim 8, comprising impregnating the calcined moulded material with an aqueous solution of a cerium salt of a readily decomposable acid; drying the cerium salt applied to the moulded material at temperatures within the range 130° to 150°C; decomposing the dry cerium salt on the moulded material by gradual heating at temperatures within the range 200° to 300°C and within the range 450° to 550°C, respectively; and calcining the resulting cerium oxide-containing moulded material at temperatures within the range 700° to 900°C.

10. The process as claimed in claim 8, wherein the pure aluminum oxide is produced by hydrolyzing aluminum chloride with the use of an oxyhydrogen flame.

11. The process as claimed in claim 8, wherein the aluminum oxide is stirred into water and the resulting paste is dried at 100°C.

12. The process as claimed in claim 11, wherein the dry mass is ground.

13. The process as claimed in claim 8, wherein the aluminum oxide is moulded in admixture with graphite.

14. The process as claimed in claim 13, wherein the aluminum oxide is moulded in admixture with between 3 and 10 wt. % of graphite.

15. The process as claimed in claim 14, wherein the aluminum oxide is moulded in admixture with 5 wt. % of graphite.

16. The process as claimed in claim 13, wherein the graphite is burned off prior to subjecting the moulded material to calcination.

17. The process as claimed in claim 16, wherein the graphite is burned off at temperatures within the range 500° to 750°C.

18. The process as claimed in claim 17, wherein the graphite is burned off at 650°C.

19. The process as claimed in claim 8, wherein nitrates are the copper, manganese and nickel salts of decomposable acids.

20. The process as claimed in claim 9, wherein cerium nitrate is the cerium salt of a readily decomposable acid.

21. The process as claimed in claim 19, wherein the nitrates of copper, manganese and nickel are decomposed at temperatures within the range 350° to 450°C.

22. The process as claimed in claim 8, wherein the moulded material containing copper, manganese and nickel oxides is calcined at temperatures within the range 950° to 1050°C.

\* \* \* \* \*

UNITED STATES PATENT OFFICE
CERTIFICATE OF CORRECTION

Patent No. 3,923,690     Dated December 2, 1975

Inventor(s) Wilhelm Vogt et al.

It is certified that error appears in the above-identified patent and that said Letters Patent are hereby corrected as shown below:

The term of this patent subsequent to

October 15, 1991, has been disclaimed.

Signed and Sealed this eleventh Day of May 1976

[SEAL]

Attest:

RUTH C. MASON
Attesting Officer

C. MARSHALL DANN
Commissioner of Patents and Trademarks